US012748984B2

(12) United States Patent
Bowden, Jr. et al.

(10) Patent No.: US 12,748,984 B2
(45) Date of Patent: Sep. 29, 2026

(54) REQUIREMENTS DECOMPOSITION FOR ENGINEERING APPLICATIONS

(71) Applicant: Chevron U.S.A. Inc., San Ramon, CA (US)

(72) Inventors: Larry A. Bowden, Jr., Houston, TX (US); Juan Esteban E. Montero, Houston, TX (US); Keith Stanley Johnston, Sugarland, TX (US); Steven R. Szabo, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 1154 days.

(21) Appl. No.: 17/777,930

(22) PCT Filed: Nov. 24, 2020

(86) PCT No.: PCT/US2020/062018
§ 371 (c)(1),
(2) Date: May 18, 2022

(87) PCT Pub. No.: WO2021/108407
PCT Pub. Date: Jun. 3, 2021

(65) Prior Publication Data
US 2022/0414485 A1 Dec. 29, 2022

Related U.S. Application Data

(60) Provisional application No. 62/940,476, filed on Nov. 26, 2019.

(51) Int. Cl.
*G06F 8/10* (2018.01)
*G06F 40/20* (2020.01)
(Continued)

(52) U.S. Cl.
CPC ............... *G06N 5/022* (2013.01); *G06F 8/10* (2013.01); *G06F 40/20* (2020.01); *G06Q 10/063* (2013.01)

(58) Field of Classification Search
CPC ....... G06F 40/20; G06F 30/20; G06Q 10/063; G06Q 10/10
See application file for complete search history.

(56) References Cited

U.S. PATENT DOCUMENTS 7,716,239 B2 * 5/2010 Murez ................ G05B 23/0264 707/779
8,504,506 B2 * 8/2013 Narendra .............. G06Q 10/06 706/46
(Continued)

FOREIGN PATENT DOCUMENTS

EP 1783744 B1 10/2011
WO 1988008160 10/1988

OTHER PUBLICATIONS

Description PCT International Search Report and Written Opinion, International Application No. PCT/US20/62018, mailed Mar. 2018 (7 pages).
(Continued)

*Primary Examiner* — Beau D Spratt
(74) *Attorney, Agent, or Firm* — Esplin & Associates, PC

(57) ABSTRACT

Words in a requirement may be decomposed into sub-parts to dynamically generate a requirement graph model. The requirement graph model may include nodes for the sub-parts of the requirement. The requirement graph model may be connected to a constraint graph model based on one or more nodes of the requirement graph model. The connection of the requirement graph model to the constraint graph model may form a combined graph model, and analysis may be performed based on the combined graph model.

15 Claims, 6 Drawing Sheets

(51) Int. Cl.
*G06N 5/022* (2023.01)
*G06Q 10/063* (2023.01)

(56) References Cited

U.S. PATENT DOCUMENTS

| | | | | |
|---|---|---|---|---|
| 8,639,509 | B2 | 1/2014 | Weng | |
| 9,639,450 | B2 * | 5/2017 | Manolios | G06F 8/10 |
| 11,151,992 | B2 * | 10/2021 | Cui | G06V 40/161 |
| 11,263,209 | B2 | 3/2022 | Bowden, Jr. | |
| 2008/0255682 | A1 * | 10/2008 | Zhao | G05B 23/0289 700/30 |
| 2013/0060546 | A1 * | 3/2013 | Berenbach | G06F 8/10 703/6 |
| 2014/0172417 | A1 | 6/2014 | Monk, II | |
| 2016/0189028 | A1 | 6/2016 | Hu | |
| 2017/0132203 | A1 * | 5/2017 | Kim | G06F 40/279 |
| 2018/0107582 | A1 * | 4/2018 | Han | G06F 11/3608 |
| 2020/0277847 | A1 | 9/2020 | Rojas | |
| 2021/0302612 | A1 | 9/2021 | Venkatakrishnan | |
| 2021/0312311 | A1 | 10/2021 | Bowden, Jr. | |

OTHER PUBLICATIONS

AU Examination Report No 1 for AU Application No. 2020394396, mailed May 8, 2023 (3 pages).

* cited by examiner

REQUIREMENTS DECOMPOSITION FOR ENGINEERING APPLICATIONS

CROSS-REFERENCE TO RELATED APPLICATIONS

The present application is a National Phase Entry of International Application No. PCT/US2020/062018, filed on Nov. 24, 2020, which claims the benefit of U.S. Provisional Application No. 62/940,476, entitled "REQUIREMENTS DECOMPOSITION FOR ENGINEERING APPLICATIONS," which was filed on Nov. 26, 2019, the entirety of each is hereby incorporated herein by reference.

FIELD

The present disclosure relates generally to the field of analyzing requirements using graph models of the requirements.

BACKGROUND

Increasingly complex facilities and autonomous systems have advanced process automation and complex processes controls where engineering requirements to address risk cannot effectively be identified using traditional technology, philosophies, risk assessments, and processes. Engineering requirements may exist in disparate business processes, workflows, schedules, and models that are not easily accessible and may not represent the most current version.

There exists a need for a cross-functional interface capable of identifying and collecting requirements from a range of sources related to systems engineering.

SUMMARY

This disclosure relates to analyzing requirements. Requirement information and/or other information may be obtained. The requirement information may define one or more requirements. Sub-parts of the requirement(s) may be identified based on words of the requirement(s) and/or other information. Requirement graph model(s) of the requirement(s) may be generated. The requirement graph model(s) may include nodes for the sub-parts of the requirement(s). The requirement graph model(s) may be connected to one or more constraint graph models based on one or more nodes of the requirement graph model(s) and/or other information. Connection of the requirement graph model(s) to the constraint graph model(s) may form one or more combined graph model(s). Analysis may be performed based on the combined graph model(s) and/or other information.

A system that analyzes requirements may include one or more electronic storage, one or more processors and/or other components. The electronic storage may store requirement information, information relating to requirements, information relating to sub-parts of requirements, information relating to requirement graph models, information relating to constraint graph models, information relating to combined graph models, and/or other information.

The processor(s) may be configured by machine-readable instructions. Executing the machine-readable instructions may cause the processor(s) to facilitate analyzing requirements. The machine-readable instructions may include one or more computer program components. The computer program components may include one or more of a requirement component, a sub-part component, a graph model component, a connect component, an analysis component, and/or other computer program components.

The requirement component may be configured to obtain requirement information and/or other information. The requirement information may define one or more requirements. In some implementations, words of a requirement may be stored in a prose format. In some implementations, a requirement may be analyzed to determine a grading that reflects a quality of the requirement The sub-part component may be configured to identify sub-parts of a requirement based on words of the requirement and/or other information. In some implementations, identification of the sub-parts of the requirement may include decomposition of the words of the requirement in the prose format into the sub-parts. In some implementations, the sub-parts of the requirement may include a subject, an object, a predicate, and a context.

The graph model component may be configured to generate one or more requirement graph models of the requirement(s). A requirement graph model may include nodes for the sub-parts of the requirement. In some implementations, the requirement graph model may include a subject node corresponding to the subject of the requirement, an object node corresponding to the object of the requirement, a predicate node corresponding to the predicate of the requirement, and a context node corresponding to the context of the requirement. In some implementations, a requirement graph model may be dynamically generated based on need.

The connect component may be configured to connect the requirement graph model(s) to one or more constraint graph models. A requirement graph model may be connected to a constraint graph model based on one or more nodes of the requirement graph model and/or other information. Connection of a requirement graph model to a constraint graph model may form a combined graph model.

In some implementations, a constraint graph model may include a control structure node, an unsafe condition node, and a hazard node. In some implementations, a constraint graph model may further include a constraint requirement graph model. In some implementations, a requirement graph model may be connected to a constraint graph model based on matching between one or more nodes of the requirement graph model with one or more nodes of the constraint requirement graph model.

The analysis component may be configured to perform analysis based on the combined graph model and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to analyzing requirements. Words in a requirement may be decomposed into sub-parts to dynamically generate a requirement graph model. The requirement graph model may include nodes for the sub-parts of the requirement. The requirement graph model may be connected to a constraint graph model based on one or more nodes of the requirement graph model. The connection of the requirement graph model to the constraint graph model may form a combined graph model, and analysis may be performed based on the combined graph model.

Figure 1:
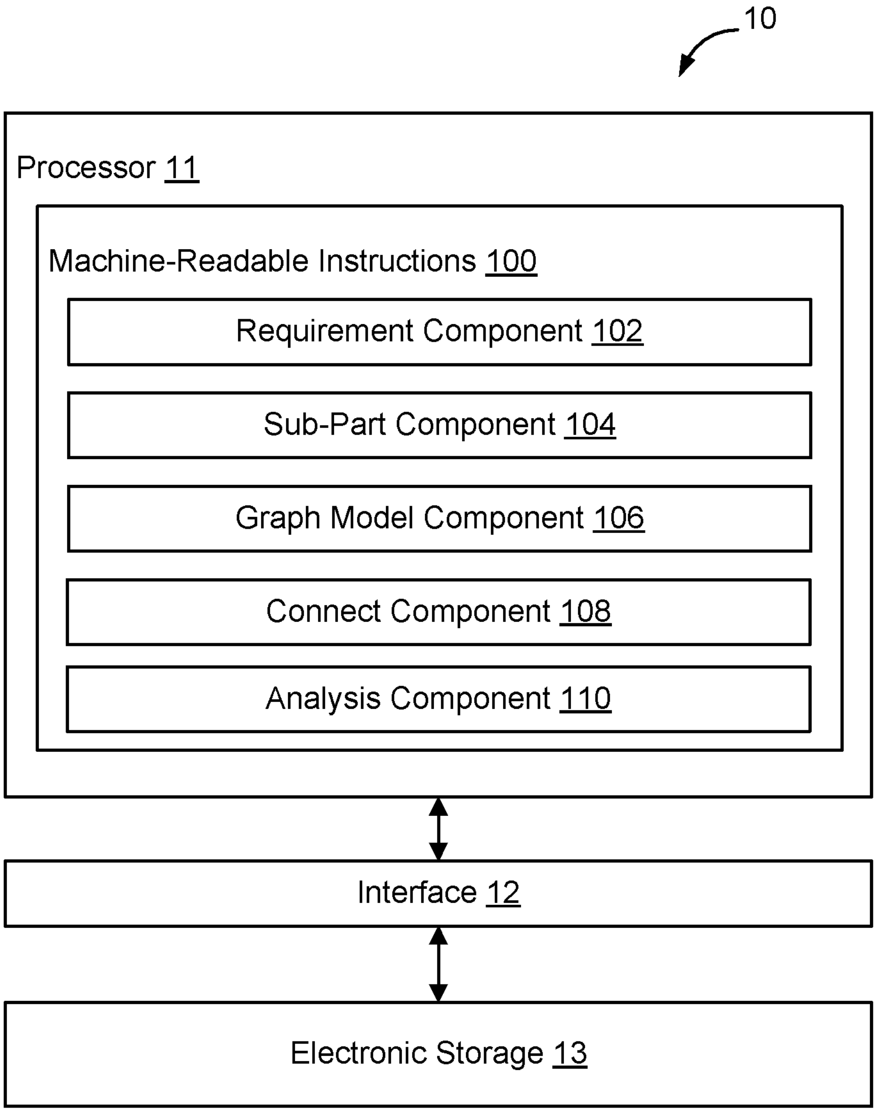
FIG. 1 illustrates an example system that analyzes requirements.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, and/or other components. Requirement information and/or other information may be obtained by the processor 11. The requirement information may define one or more requirements. Sub-parts of the requirement(s) may be identified by the processor 11 based on words of the requirement(s) and/or other information. Requirement graph model(s) of the requirement(s) may be generated by the processor 11. The requirement graph model(s) may include nodes for the sub-parts of the requirement(s). The requirement graph model(s) may be connected to one or more constraint graph models by the processor 11 based on one or more nodes of the requirement graph model(s) and/or other information. Connection of the requirement graph model(s) to the constraint graph model(s) may form one or more combined graph model(s). Analysis may be performed by the processor 11 based on the combined graph model(s) and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store requirement information, information relating to requirements, information relating to sub-parts of requirements, information relating to requirement graph models, information relating to constraint graph models, information relating to combined graph models, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate analyzing requirements. The machine-readable instructions 100 may include one or more computer program components. The machine-readable instructions 100 may include a requirement component 102, a sub-part component 104, a graph model component 106, a connect component 108, an analysis component 110, and/or other computer program components.

The requirement component 102 may be configured to obtain requirement information and/or other information. Obtaining requirement information may include one or more of accessing, acquiring, analyzing, determining, examining, identifying, loading, locating, opening, receiving, retrieving, reviewing, selecting, storing, and/or otherwise obtaining the requirement information. The requirement information component 102 may obtain requirement information from one or more locations. For example, the requirement information component 102 may obtain requirement information from a storage location, such as the electronic storage 13, electronic storage of a device accessible via a network, and/or other locations. The requirement information component 102 may obtain requirement information from one or more hardware components (e.g., a computing device) and/or one or more software components (e.g., software running on a computing device).

The requirement information component 102 may obtain requirement information from one or more requirement management tools, such as a requirement management database (e.g., Polarion database). The requirement management database may be used to store and manage requirements. The requirement management data may store and manage individual requirements and/or requirement documents including one or more requirements. In some implementations, the requirement management database may have an open architecture and/or support Simple Object Access Protocol (SOAP) for programmatic interaction.

The requirement information may define one or more requirements. A requirement may refer to a physical and/or functional need that is to be met/satisfied. For example, a requirement may refer to an engineering requirement. A requirement may refer to a physical and/or functional need that a design, product, equipment, and/or process aims to meet/satisfy. A requirement may refer to desired and/or necessary function, attribute, capability, characteristic, and/or quality of the design, product, equipment, and/or process. A requirement may refer to a rule that is to be followed when using the design, product, equipment, and/or process.

The requirement information may define a requirement by including information that defines (e.g., identifies, reflects, quantifies) content of the requirement, such as words, numbers, symbols, spacing, structure, punctuation, media, and/or other content of the requirement. For instance, the requirement information may include information that makes up and/or is used to determine words, numbers, symbols, spacing, structure, punctuation, media, and/or other content of the requirement. In some implementations, the content of a requirement may be stored in a prose format and/or other format. For example, words making up a requirement may be stored in a prose format and/or other format. Words in the prose format may include the words arranged in one or more statements/sentences. The requirement information may be stored within a single file or across multiple files. Other types of requirement information are contemplated.

A requirement may be stored separately from other requirement(s) and/or stored together with other requirement(s). For example, individual requirements may be stored separately in different files/documents. Multiple requirement may be stored together in a single file/document. The requirement information may define a single requirement or multiple requirements. For instance, the requirement information may define the content of a single requirement or the content of a requirement document including multiple requirements. For example, a requirement may be defined within one or more sentences, one or more paragraphs, one or more sections, and/or other groups of words within the requirement document. A requirement document may include other information relating to the design, product, equipment, and/or process. For example, a requirements document may include information defining background, definitions, explanations, footnotes, and/or other information that provide context for the requirements.

In some implementations, the requirement information may be obtained based on filtering and/or other information. For example, the requirement information component 102 may obtain requirement information defining all requirements stored in a requirement management database. The requirement information component 102 may obtain requirement information based on filtering using one or more attributes of the requirements stored in the requirement management database. For example, requirements in the requirement management database may be filtered based on conventional versus conventional requirements, based on design, product, equipment, and/or process relating to the requirements, based on location relating to the requirements, based on time relating to the requirements, and/or other attributes of the requirements. For instance, the requirement information component 102 may receive user input defining filtering parameters, which may be passed onto one or more requirement queries to limit the scope/amount of requirement information obtained by the requirement information component 102.

The sub-part component 104 may be configured to identify sub-parts of a requirement based on the content of the requirement and/or other information. For example, the sub-parts of a requirement may be identified based one or more of words, numbers, symbols, spacing, structure, punctuation, media, and/or other content of the requirement. A sub-part of a requirement may refer to a portion of the requirement. A sub-part of a requirement may refer to a portion of the requirement that may be used in graph modeling of the requirement. In some implementations, the sub-parts of a requirement may include a subject, an object, a predicate, a context, and/or other sub-parts of the requirement. The subject may refer to one or more entities about which a statement in the requirement is made. The object may refer to one or more entities that may be acted upon by the subject. The predicate may modify description of one or more things/entities within the requirements. The context may refer to/define the scope of the requirement, such as one or more circumstances that form the setting for the requirement. In some implementations, the context of the requirement may be identified further based on information surrounding the requirement. For example, the context of the requirement may be identified based on a sentence/words defining the requirement, documents/container in which the requirement is found, and/or other information surrounding the requirement. Such context of the requirement may enable a broader analysis of constraints and requirement (e.g., go beyond connecting a single constraint to a single requirement). Context may be derived from meta data associated with the specific requirement and associated references. References may include external documents with the same or similar requirement.

In some implementations, one or more sub-parts of a requirement may be identified further based on one or more standards and/or one or more guidelines. For example, the sub-part(s) of a requirement may be identified in accordance with the International Council on Systems Engineering (INCOSE) Guide for Writing Requirements and/or other standards/guidelines.

The sub-part component 104 may utilize language processing (e.g., natural language processing, word/symbol detection) to analyze the content of the requirement for sub-part identification. In some implementations, one or more analytics and/or requirements processing may be used to analyze the requirements. For example, the requirements may be analyzed based on one or more techniques described in US Patent Application Publication No. 2020/0341974, titled Content-Sensitive Feature Score Generation, entirely of which is incorporated herein by reference. In some implementations, one or more vector modeling engines may be used to analyze the requirement according to one or more standards and/or one or more guidelines (e.g., INCOSE standard/guideline).

The sub-part component 104 may analyze a requirement to identify different parts of the requirement (e.g., determine which portions correspond to the requirement, guidance, regular text, explanatory text) and/or to identify different types of requirements. Output of the analysis of a requirement may be stored with and/or separately from the requirement. For example, the output of the analysis may be stored as attributes of the requirement and/or as tags assigned to the requirement. The output of the analysis (e.g., attributes, tags) may enable packaging of the requirements. For example, the attributes and/or tags of the requirements may be used to filter the requirements for relevant to a particular topic, and the relevant requirements may be packaged for delivery.

In some implementations, identification of the sub-parts of the requirement may include decomposition of the words of the requirement in the prose format into the sub-parts. The words of the requirement in prose format (e.g., statement(s) in the requirement) may be broken up into the sub-parts, such as into subject, object, predict, context, and/or other sub-parts of the requirement. Such sub-parts of the requirement may be used to generate a graph model of the requirement. In some implementations, the requirement may be analyzed to determine references to context. In some implementations, the requirement may be analyzed to determine a grading that reflects a quality of the requirement. For example, the grading may reflect the degree to which the requirement is clear and/or precise. For instance, the grading may correspond to a measure of whether and/or to what extent the requirement includes ambiguous language, precise language, defined terms, imprecise quantifiers, units for quantities, vague words (e.g., vague adverbs/adjectives), and/or other language.

The graph model component 106 may be configured to generate one or more requirement graph models of the requirement(s). A requirement graph model may refer to a graph model of a requirement. A requirement graph model may include one or more nodes representing one or more aspects of the requirement, such as nodes to represent sub-parts of the requirement. A node of a requirement graph model may be a computational node. A requirement graph model may include edges between nodes to represent relationship/connection between different aspects of the requirements.

Figure 3:
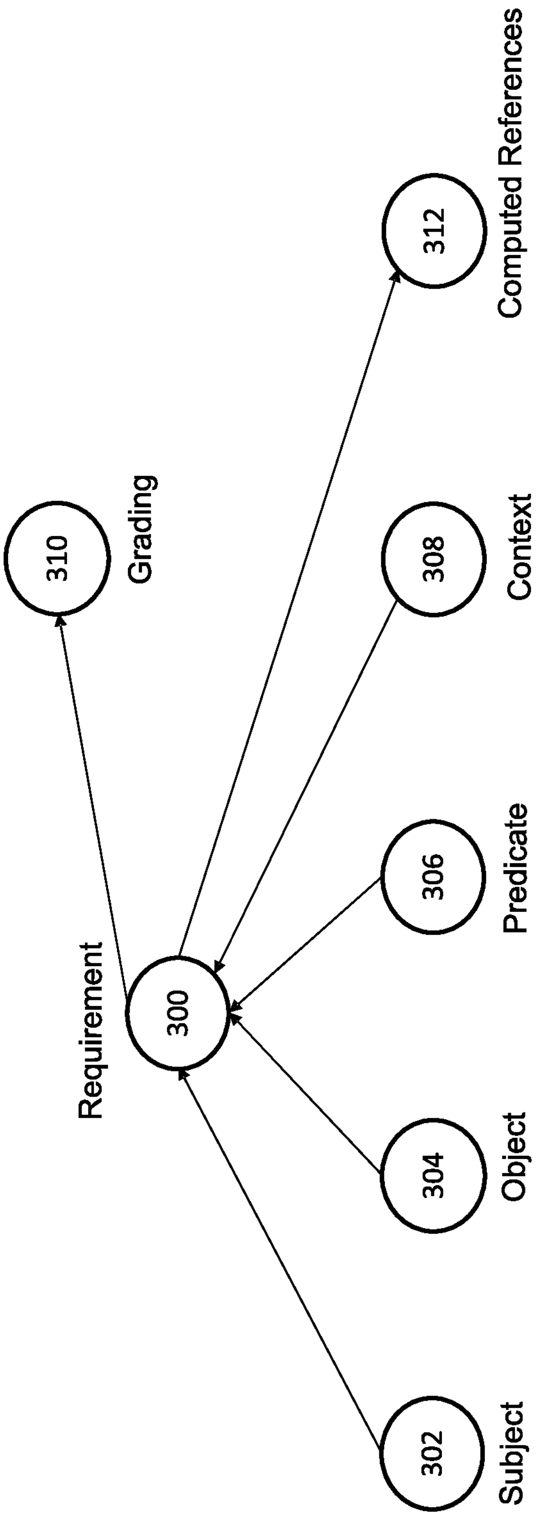
FIG. 3 illustrates example graph model of a requirement.

FIG. 3 illustrates example graph model of a requirement. The requirement graph model shown in FIG. 3 may include a requirement node 300 representing the requirement. The requirement graph model may include a subject node 302 corresponding to a subject of the requirement, an object node 304 corresponding to an object of the requirement, a predicate node 306 corresponding to a predicate of the requirement, a context node 308 corresponding to a context of the requirement, and/or other nodes corresponding to other sub-parts of the requirement. The requirement graph model may include a grading node 310 corresponding to a grading of the requirement. The requirement graph model may include a computed references node 312 corresponding to computed references for the requirement.

In some implementations, a requirement graph model may be dynamically generated based on need. The dynamically generated requirement graph model may be made available to one or more processes. For example, a requirement graph model of a requirement may be dynamically generated on the fly rather than being stored. For example, a computational graph node may be pointed to the requirement management database. A graph QL microservice endpoint may be utilized to read the requirements and generate the requirement graph models for connection to other graph models.

The graph model component 106 may be configured to obtain and/or generate other graph models. For instance, the graph model component 106 may obtain previously generated graph model and/or generate other types of graph models. For example, the graph model component 106 may obtain and/or generate a control structure model. A control structure model may refer to a graph model of one or more control structures. A control structure model may include nodes that represent different control structures. A control structure may include components and/or controllers, such as equipment, sub systems, systems, facilities, people, organizations, and/or entities. A control structure model may include edges between nodes that represent relationship/connection between different control structures. For example, control structures may interact with other control structures by sending a control action or feedback, and the control structure model may include edges between nodes that represent the control action or feedback information between the corresponding control structures.

As another example, the graph model component 106 may obtain and/or generate a constraint graph model. A constraint graph model may refer to a graph model of one or more constraints (e.g., limitations, restrictions, rules) relating to a control structure, a system, and/or a process. For example, a constraint graph model may model, using nodes and edges, one or more outputs of a systems theoretic process analysis (STPA). STPA may refer to a process of generating engineering requirement using one or more control structures. STPA may refer to a process of examining engineering systems/components to identify unsafe conditions and/or hazards, and generating one or more requirements (constraint requirement(s)) to prevent the unsafe condition(s) and/or hazard(s). An unsafe condition may result from unsafe control actions (e.g., action not given, action given incorrectly, action with wrong timing). The unsafe conditions may be identified to create corresponding safety constraints. A hazard may refer to a system state and/or a set of conditions that, in a particular context (e.g., set of worst-case conditions), may lead to one or more problems (e.g., accident, loss).

Figure 4:
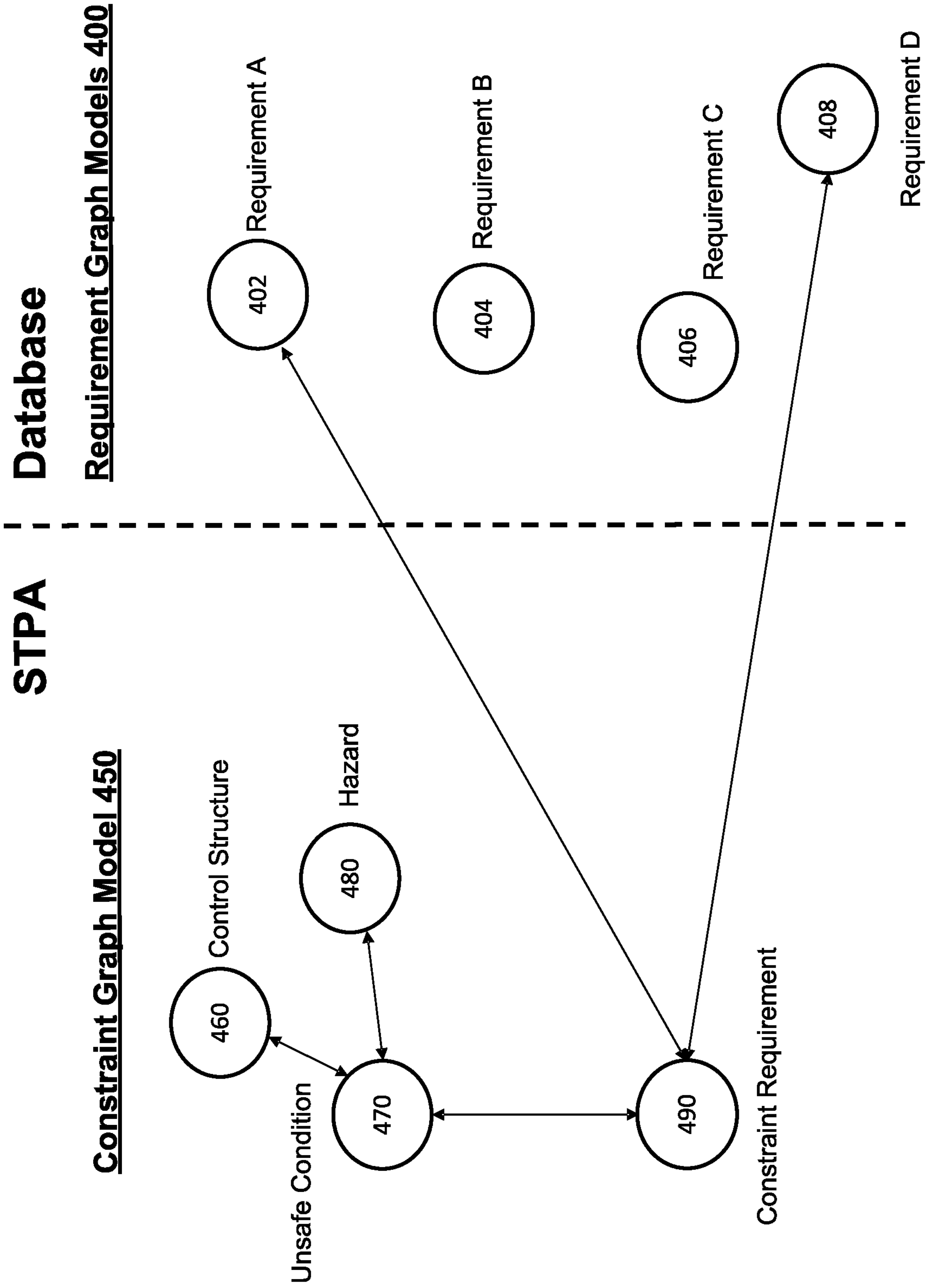
FIG. 4 illustrates example modeling of STPA output and requirements in a database.

FIG. 4 illustrates example modeling of STPA output and requirements in a database. In FIG. 4, a constraint graph model 450 may represent a graph model of STPA output. The constraint graph model 450 may include a control structure node 460 corresponding to a control structure, an unsafe condition node 470 corresponding to an unsafe condition for/relating to the control structure, a hazard node 480 corresponding to a hazard associated with the unsafe condition, and/or other nodes.

In some implementations, the constraint graph model 450 may further include a constraint requirement node 490. The constraint requirement node 490 may represent a constraint requirement created to address the unsafe condition (e.g., unsafe condition identified from the hazard). The constraint requirement node 490 may represent and/or include a constraint requirement graph model, which may include nodes for the sub-parts of the constraint requirement.

The connect component 108 may be configured to connect the requirement graph model(s) to one or more constraint graph models. A requirement graph model may be connected to a constraint graph model based on one or more nodes of the requirement graph model and/or other information. Connection of a requirement graph model to a constraint graph model may form a combined graph model. The combined graph model made provide a knowledge graph that allows data to be used with graph mathematics to enable new capabilities not present within individual graph models.

In some implementations, one or more components of the combined graph may be generated and/or referenced per one or more standards and/or one or more guidelines. For instance, requirements may be generated and reference in the combined graph per INCOSE standards/guidelines.

For example, referring to FIG. 4, requirement graph models 400 may include a requirement A graph model 402, a requirement B graph model 404, a requirement C graph model 406, and a requirement D graph model 408 for requirements A, B, C, D (e.g., stored in and obtained from a requirements management database). The requirement A graph model 402 may be connected to the constraint graph model 450 based on one or more nodes of the requirement A graph model 402. The requirement D graph model 408 may be connected to the constraint graph model 450 based on one or more nodes of the requirement A graph model 402. The combined graph model may include the requirements A and D being associated with the constraint requirement, control structure, unsafe condition, and hazard from the STPA output.

Figure 5:
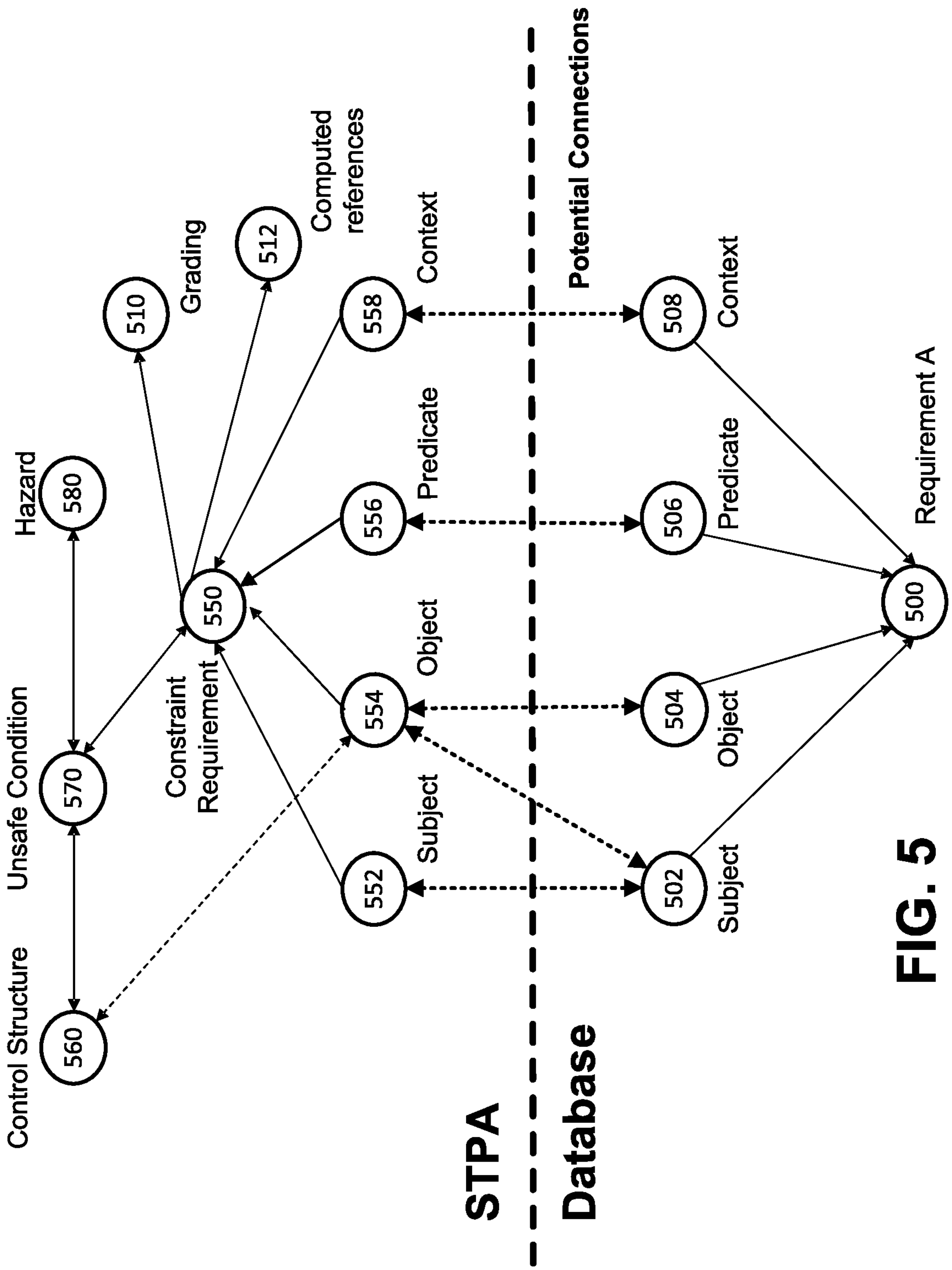
FIG. 5 illustrates example connections between requirement from STPA and requirement in a database.

For example, FIG. 5 illustrates example connections between a constraint requirement from STPA and a requirement (Requirement A) in a database (e.g., requirement management database). The constraint requirement from STPA may be represented by a constraint requirement node 550. STPA output may further be modeled into a control structure node 560, an unsafe condition node 570, a hazard node 580, and edges between the nodes. The constraint requirement may be analyzed (e.g., decomposed) to identify/determine the subject, object, predicate, context, grading, and/or computed references. The subject of the constraint requirement may be represented by a subject node 552, the object of the constraint requirement may be represented by an object node 554, the predicate of the constraint requirement may be represented by a predicate node 556, the context of the constraint requirement may be represented by a context node 558, the grading of the constraint requirement may be represented by a grading node 510, and the computed references of the constraint requirement may be represented by a computed references node 512.

The requirement A may be represented by a requirement A node 500. The subject of the requirement A may be represented by a subject node 502, the object of the requirement A may be represented by an object node 504, the predicate of the requirement A may be represented by a predicate node 506, the context of the requirement A may be represented by a context node 508

A requirement graph model may be connected to a constraint graph model based on matching between one or more nodes of the requirement graph model with one or more nodes of the constraint requirement graph model. For example, decomposed sub-parts of the constraint requirement from STPA may be used to connect to decomposed sub-parts of the requirement in a requirement management database. The requirements in requirement management database may be used as constraints and/or targets by systems engineering modeling language rules. By establishing connections between the requirement from STPA and requirements stored in the database, digital twins based on the systems engineering modeling language may be linked to the hazards and unsafe conditions to support systems engineering analysis.

For example, FIG. 5 shows potential connections between nodes of the requirement graph model (representing requirement from a database) and a constraint graph model (representing output of STPA). The subject node 502 of the requirement graph model may be connected to the subject node 552 of the constraint graph model based on matching between the corresponding subjects. The object node 504 of the requirement graph model may be connected to the object node 554 of the constraint graph model based on matching between the corresponding objects. The predicate node 506 of the requirement graph model may be connected to the predicate node 556 of the constraint graph model based on matching between the corresponding predicates. The context node 508 of the requirement graph model may be connected to the context node 558 of the constraint graph model based on matching between the corresponding contexts. Thus, sub-parts of the requirements in a database may be linked to sub-parts of constraint requirement from STPA.

Matching between nodes (e.g., matching between corresponding subjects, objects, predicates, context) may require the nodes to be same, similar, have same/similar relationship, and/or other types of matching. For example, two subject nodes may be matched based on the nodes representing the same equipment, based on the nodes representing similar equipment, based on the nodes representing pieces of the same equipment, based on one node representing equipment while another node representing a piece of the equipment, and/or based on other relationship between the corresponding equipment. Other types of matching are contemplated.

In some implementations, connections may be formed between nodes of different types. For example, the object node 554 and the control structure node 560 may be connected based on matching between the object of the object node 554 and the control structure of the control structure node 560 (e.g., the object being the same as the control structure, such as same equipment, system, process, organization, entity). As another example, the subject node 502 of the requirement graph model and the object node of the constraint graph model may be connected based on matching between the subject of the subject node 502 and the object of the object node 554.

In some implementations, connection between a requirement graph model (e.g., requirement in a database) and a constraint graph model may require multiple connections between the nodes and/or particular combination of connections between the nodes. For example, a requirement in a database may be connected to a constraint requirement from STPA based on the corresponding graph modeling including at least a certain number of connections. A requirement in a database may be connected to a constraint requirement from STPA based on the corresponding graph modeling including particular types of connections (e.g., connections between subjects and context, connections between objects and at least one other connection).

While certain implementations of the disclosure has been described with respect to STPA, this is merely as an example and is not meant to be limiting. Other hazard analysis techniques and/or systems engineering model may be used to model constraint threads/parameters to connect requirements to constraints. Other sources of constraint requirement and/or unsafe conditions may be used. For example, processes other than STPA may be used to identify unsafe conditions, constraint requirements, and the connections between them. In some implementations, taxonomy of different layers (e.g., industry, business category, installation, plant/unit, selection/system, equipment unit, subunit, component/maintainable item/part, part) may be applied to model nodes and edges of constraints. Similarly, taxonomy of different layers may be applied to model nodes and edges of requirements.

In some implementations, connections between nodes and/or graph models may be established based on type(s) of capabilities to be enabled through the combined graph model. Different relationships may be established based on the questions to be answered through the combined graph model. For example, different connections may be made between nodes and/or graph models based on whether the combined graph model is to be used to package requirements or to determine whether there are conflicts between requirements.

The analysis component 110 may be configured to perform analysis based on the combined graph model and/or other information. Performing analysis based on the combined graph model may include examining, evaluating, processing, studying, and/or performing other analysis using one or more nodes (e.g., control structure, unsafe condition, hazard, grading, requirement, subject, object, predicate, context, computed references), one or more edges, and/or other characteristics of the combined graph model. Performing analysis based on the combined graph model may include using graph mathematics to utilize capabilities enabled through combination of multiple graph models. The combined graph model may form a computational knowledge graph that represent requirements and engineering data for query capabilities.

Analysis may be performed based on the combined graph model to determine information relating to requirements, sub-parts of requirements, control structures, unsafe conditions, hazards, and/or other things, relationships, and/or concepts represented by components of the combined graph model. Depending on the question to be answered, different nodes and/or different edges between the nodes may be analyzed to perform the analysis.

For example, analysis may be performed based on the combined graph model to package certain types of requirements for delivery. Such delivery of requirements may enable users to receive requirements relevant to a project rather than having to manually shift through requirements in a database to identify the relevant requirements. Analysis may be performed based on the combined graph model to identify most/top influential requirement for a particular context or a particular system. Analysis may be performed based on the combined graph model to identify which requirements are effective or non-effective based on occurrence of a particular unsafe condition. Analysis may be performed based on one or more centrality metrics, such as by discovering nodes and/or edges based on degrees of centrality and/or number of hops between nodes. Analysis may be performed based on the combined graph model to dynamically determine constraints and/or limits based on operating condition of tools. Other types of analysis based on the combined graph model are contemplated.

For example, analysis may be performed based on the combined graph model to provide information relating to drilling operations. A graph query may be called to retrieve information relating to a drilling operation, such as constraints/limits on drilling parameters (e.g., pressure limit, flow limit, temperature limit). Rather than retrieving fixed numbers, the combined graph model may be used to dynamically determine the constraints/limits based on conditions of the drilling operation. Such determination of constraints/limit may enable more cost effective and more appropriate drilling operating and/or drilling designs and enable drilling at lower costs and/or faster speeds. The requirements may provide rules/equations to calculate the constraints/limits, and other parts of the combined graph model (e.g., subject node, object node) may provide information on inputs to the rules/equations.

For example, to determine pressure limit for drilling a particular well, the query may utilize the connection between requirement node(s) and subject node(s) to retrieve information on the design of drilling tools to be used to drill the well. Information on the drilling tool designs may be fed into relevant requirements to dynamically determine pressure limit values for drilling the well. The combined graph model may be used to determine new constraints/limits when there are changes to the design.

The combined graph model may form and/or enable a common work platform/interface that is cross-functional and includes modules that improve business processes, workflows, schedules, and engineering/technical models using a systems engineering approach to improving design. The combined graph model may connect together and enable access to requirements, workflows, schedules, and/or models that exist in disparate locations (e.g., disparate business processes).

For example, the combined graph model may connect otherwise siloed and/or disconnected systems and processes. Conventional methods may work in silos to develop individual business processes, workflows, schedules, and models and these elements may not integrated in a way that allows relevant data to be incorporated and assessed in a timely manner. In such a case, the plan may not be optimized with a full-field view, and there may be no adjustment/update based on new information (e.g., always applying worst-case scenario approach). The combined graph model may enable dynamic full-field development planning to enable multiple scenarios and updates based on performance through integrated planning workflows, integrated data, scenario-based model, and digital twins. The combined graph model may enable analysis, identification, and/or collection of requirements of a range of sources related to systems engineering. The combined graph model may enable identification of conflicts between requirements from different sources.

Figure 6:
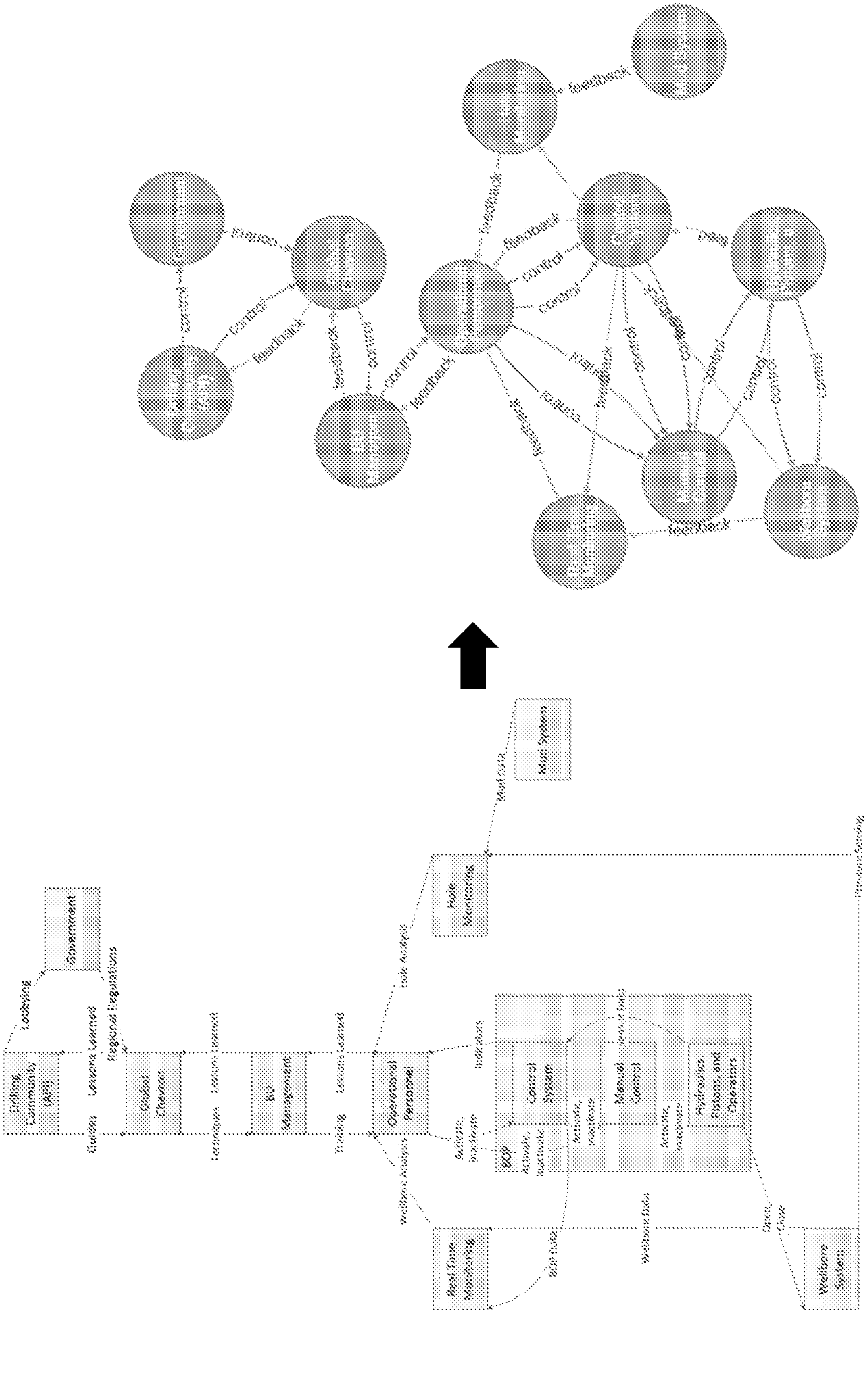
FIG. 6 illustrates an example conversion of control structures and relationships between control structures into a graph model that represents the control structures using nodes and the relationships using edges.

FIG. 6 illustrates an example conversion of control structures and relationships between control structures into a graph model that represents the control structures using nodes and the relationships using edges. Individual nodes may include unsafe condition, hazard, and requirement to address the unsafe condition/hazard. Connections between the nodes may enable analysis that explores the relationships between the control structures. Connecting the control structures to the requirements in a requirements management database may form a combined graph model, and the combined graph model may enable analysis that that takes into account the requirements, sub-parts of the requirements, control structures, unsafe conditions, hazards, relationships, and/or other thing/concepts represented by components of the combined graph model.

Some of the benefits of the present disclosure include improvement in delivery of consistent designs (e.g., well designs) and execution plans, time and effort reduction for engineers, simplification of standards and standard operating procedures, identification of relevant requirements for projects, reduction in planning time, reduction in management of change, improved use of information from prior operations, improved sharing of knowledge, improvement in defining operating procedures based on relevant/most influential requirements, and approval of individual requirements vs requirement documents.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 and the electronic storage 13 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor

11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
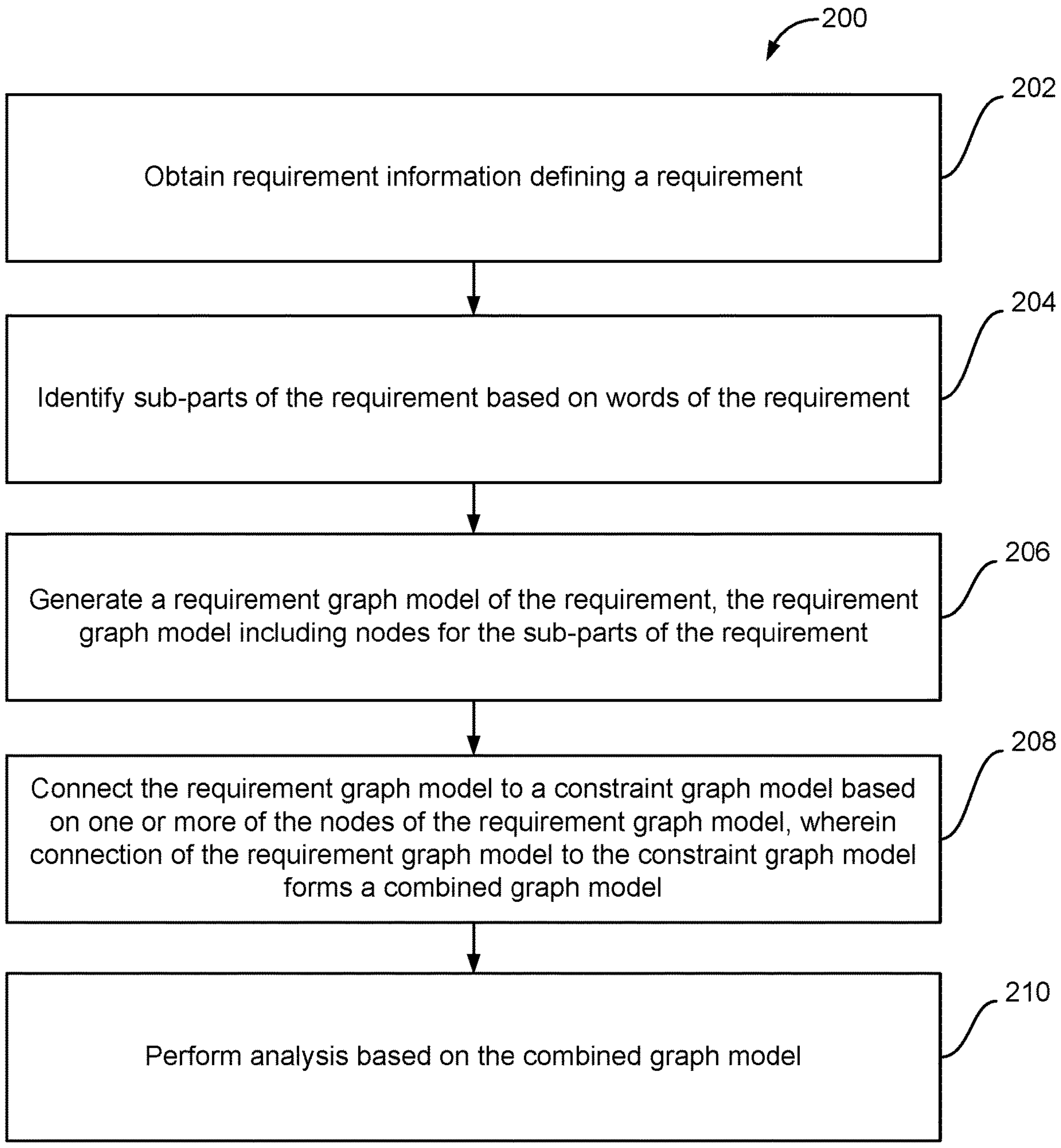
FIG. 2 illustrates an example method for analyzing requirements.

FIG. 2 illustrates method 200 for analyzing requirements. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, requirement information may be obtained. The requirement information may define a requirement. In some implementation, operation 202 may be performed by a processor component the same as or similar to the requirement component 102 (Shown in FIG. 1 and described herein).

At operation 204, sub-parts of the requirement may be identified based on words of the requirement. In some implementation, operation 204 may be performed by a processor component the same as or similar to the sub-part component 104 (Shown in FIG. 1 and described herein).

At operation 206, a requirement graph model of the requirement may be generated. The requirement graph model may include nodes for the sub-parts of the requirement. In some implementation, operation 206 may be performed by a processor component the same as or similar to the graph model component 106 (Shown in FIG. 1 and described herein).

At operation 208, the requirement graph model(s) may be connected to a constraint graph model based on one or more nodes of the requirement graph model. Connection of the requirement graph model to the constraint graph model may form a combined graph model. In some implementation, operation 208 may be performed by a processor component the same as or similar to the connect component 108 (Shown in FIG. 1 and described herein).

At operation 210, analysis may be performed based on the combined graph model. In some implementation, operation 210 may be performed by a processor component the same as or similar to the analysis component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for analyzing requirements, the system comprising: one or more physical processors configured by machine-readable instructions to:

obtain requirement information, the requirement information defining a requirement;

identify sub-parts of the requirement based on words of the requirement;

generate a requirement graph model of the requirement, the requirement graph model including nodes for sub-parts of the requirement;

connect the requirement graph model to a constraint graph model based on one or more of the nodes of the requirement graph model corresponding to one or more nodes of the constraint graph model, wherein connection of the requirement graph model to the constraint graph model forms a combined graph model, and is effected via the one or more of the nodes in the requirement graph model that correspond to the one or more nodes of the constraint graph model and the corresponding one or more nodes of the constraint graph model, wherein the combined graph model models outputs of a system's theoretic process analysis corresponding to an unsafe condition or a hazard node; and perform analysis based on the combined graph model.

2. The system of claim 1, wherein the words of the requirement are stored in a prose format, and identification of the sub-parts of the requirement includes decomposition of the words of the requirement in the prose format into the sub-parts.

3. The system of claim 2, wherein the sub-parts of the requirement include a subject, an object, a predicate, and a context, and the requirement graph model includes a subject node corresponding to the subject of the requirement, an object node corresponding to the object of the requirement, a predicate node corresponding to the predicate of the requirement, and a context node corresponding to the context of the requirement.

4. The system of claim 3, wherein the constraint graph model includes a control structure node, an unsafe condition node, and a hazard node.

5. The system of claim 4, wherein the constraint graph model further includes a constraint requirement graph model.

6. The system of claim 5, wherein the requirement graph model is connected to the constraint graph model based on matching between one or more nodes of the requirement graph model with one or more nodes of the constraint requirement graph model.

7. The system of claim 1, wherein the requirement is analyzed to determine a grading that reflects a quality of the requirement.

8. The system of claim 1, wherein the requirement graph model is dynamically generated based on need.

9. A method for analyzing requirements, the method comprising:

obtaining requirement information, the requirement information defining a requirement;

identifying sub-parts of the requirement based on words of the requirement;

generating a requirement graph model of the requirement, the requirement graph model including nodes for the sub-parts of the requirement;

connecting the requirement graph model to a constraint graph model based on one or more of the nodes of the requirement graph model corresponding to one or more nodes of the constraint graph model, wherein connection of the requirement graph model to the constraint graph model forms a combined graph model, and is effected via the one or more of the nodes in the requirement graph model that correspond to the one or more nodes of the constraint graph model and the corresponding one or more nodes of the constraint graph model, wherein the combined graph model models outputs of a system's theoretic process analysis corresponding to an unsafe condition or a hazard node; and performing analysis based on the combined graph model.

10. The method of claim 9, wherein the words of the requirement are stored in a prose format, and identification of the sub-parts of the requirement includes decomposition of the words of the requirement in the prose format into the sub-parts.

11. The method of claim 10, wherein the sub-parts of the requirement include a subject, an object, a predicate, and a context, and the requirement graph model includes a subject node corresponding to the subject of the requirement, an object node corresponding to the object of the requirement, a predicate node corresponding to the predicate of the requirement, and a context node corresponding to the context of the requirement.

12. The method of claim 11, wherein the constraint graph model includes a control structure node, an unsafe condition node, and a hazard node.

13. The method of claim 12, wherein the constraint graph model further includes a constraint requirement graph model.

14. The method of claim 13, wherein the requirement graph model is connected to the constraint graph model based on matching between one or more nodes of the requirement graph model with one or more nodes of the constraint requirement graph model.

15. The method of claim 9, wherein the requirement is analyzed to determine a grading that reflects a quality of the requirement.

* * * * *